3,399,219
POLYACID PRODUCTION

John B. Braunwarth, Crystal Lake, Ill., assignor, by mesne assignments, to Union Oil Company of California, Los Angeles, Calif., a corporation of California
No Drawing. Filed Nov. 5, 1964, Ser. No. 409,320
17 Claims. (Cl. 260—410.9)

ABSTRACT OF THE DISCLOSURE

Cycloalkyl peroxides such as cyclohexanone peroxide is reacted with a beta-ketomonocarboxylic acid such as acetoacetic acid to form a ketodicarboxylic acid.

---

This invention relates to a process for the production of monoketodicarboxylic acids or diketomonocarboxylic acids and their esters by the reaction of cycloalkyl peroxides with β-ketomonocarboxylic acid under redox conditions.

One feature of this invention is the discovery that a cycloalkanone peroxide (1-hydroxycycloalkylhydroperoxide) reacts with a β-keto acid to form a ketodicarboxylic acid. This is illustrated by the reaction

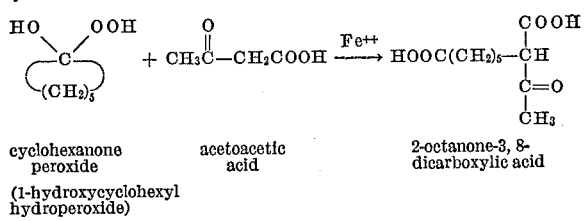

cyclohexanone peroxide (1-hydroxycyclohexyl hydroperoxide)    acetoacetic acid    2-octanone-3, 8-dicarboxylic acid Another feature of this invention is the discovery that a 1-alkylcycloalkyl hydroperoxide reacts with a β-keto-acid or a β-keto-acid ester to form diketomonocarboxylic acid or the ester as illustrated by the reaction

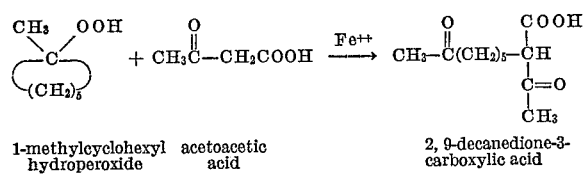

1-methylcyclohexyl hydroperoxide    acetoacetic acid    2, 9-decanedione-3-carboxylic acid A β-keto-acid ester may also be used in the reaction.

Accordingly, it becomes a primary object of this invention to provide a process for the preparation of compounds of the formula

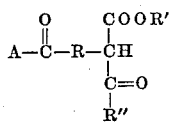

wherein A is hydroxyl or any organic radical which does not interfere with the formation and stability of the starting carbocyclic peroxide or with its use in the instant reaction; R is the nucleus from the carbocyclic peroxide, R' is hydrogen or like R'', is any organic radical which does not interfere with the reaction or with the formation and stability of the β-keto acid starting material.

Another object of this invention is to provide a process for the production of ketodicarboxylic acids.

Another object of this invention is to provide a process for the production of 2-octanone-3,8-dicarboxylic acid.

Another object of this invention is to provide a process for the production of diketomonocarboxylic acids.

And another object of this invention is to provide a process for the production of 2,9-decanedione-3-carboxylic acid.

These and other objects of this invention will be described or become apparent as the specification proceeds.

Dicarboxylic acids of aliphatic nature are useful in preparing amides, polyamides, esters and polyesters for use in resin manufacture, as plasticizing agents and for various purposes known in the art. The production of ketodicarboxylic acids and diketomonocarboxylic acids has frequently involved a procedure requiring several reaction steps. The production of dicarboxylic acids or esters is sufficiently simple to be done commercially; however, aceto- or ketodicarboxylic acids and other derivatives thereof are extremely difficult to produce. Such compounds are useful, however, as additive and drug intermediates. The products of this invention have obvious uses per se or can be used to prepare amides, polyamides, esters, polyesters, etc., having resin properties suitable for forming plastic pieces, protective coatings or for the preparation of additives, drugs, etc.

In order to illustrate this invention the following examples are given.

EXAMPLE I

To 97 g. (1.0 mole) of cyclohexanone was added 750 cc. of methanol, the solution was cooled to 0° C., a 57 g. (0.5 mole) portion of 30% $H_2O_2$ was added with rapid stirring, and this was followed by addition of 25 cc. concentrated $H_2SO_4$. To the resulting cyclohexanone peroxide solution was added 100 g. of methyl acetoacetate. A ferrous salt solution was made up by dissolving 147 g. (0.53 mole) of ferrous sulfate heptahydrate and 25 cc. of concentrated $H_2SO_4$ in 250 cc. of distilled water. This solution was added dropwise to the hydroperoxide-acetoacetic acid mixture with rapid stirring at 0° C. After addition was completed, the reaction mixture was diluted with distilled water. The methanol-water-reaction mixture was extracted with benzene. The benzene extractions were combined, dried over calcium sulfate and distilled using an 8 inch Vigreaux column. Crude fractions boiling between 95° and 125° C. at 0.2 mm. were studied by infrared. Analysis showed these fractions to have the functional groups characteristic of the methyl ester of a ketodicarboxylic acid. This experiment was repeated and the results were confirmed.

EXAMPLE II

One mole of cyclopentanone is mixed with 500 cc. of methanol and the mixture is slowly cooled to −10° C. One-half mole of 30% $H_2O_2$ is added with rapid stirring, and 25 cc. of concentrated sulfuric acid are added to form a solution of cyclopentanone peroxide. One mole of methyl acetoacetate, dissolved in about 300 cc. of methanol, is added to the peroxide solution. A ferrous salt solution, made up of about 147 g. (0.53 mole) of ferrous sulfate heptahydrate and 25 cc. of distilled water, is prepared and this ferrous sulfate solution is added slowly, dropwise, to the hydroperoxide-acetoacetate mixture with rapid stirring at −10° C. After the solution is completed, the reaction mixture is diluted with distilled water and the monoketodicarboxylic acid ester is collected in benzene and purified by distillation. The product is the methyl ester of 2-heptanone-3,7-dicarboxylic acid.

EXAMPLE III

One half mole of 1-methylcyclopentyl hydroperoxide is mixed with 500 cc. of methanol and 100 g. of methyl acetoacetate. To a ferrous salt solution made up of about 147 g. (0.53 mole) of ferrous sulfate heptahydrate dissolved in 250 cc. of distilled water, 25 cc. of concentrated sulfuric acid are added at room temperature. This ferrous sulfate solution is added slowly, dropwise, to the hydroperoxide-acetoacetate mixture with rapid stirring at −10° C. After the addition is completed, the reaction mixture is diluted with distilled water and the diketocarboxylic acid is collected in benzene and purified by distillation. The product is the methyl ester of 2,8-nonanedione-3-carboxylic acid.

The cycloalkanone peroxide reactants to be used in accordance with this invention are in general compounds of a cyclic structure having a peroxide grouping attached directly to one of the carbon atoms in said cyclic structure (referred to generically as carbocyclic peroxides). The starting material is prepared from cyclic ketones, alcohols or various alkoxy or aryloxy compounds as follows

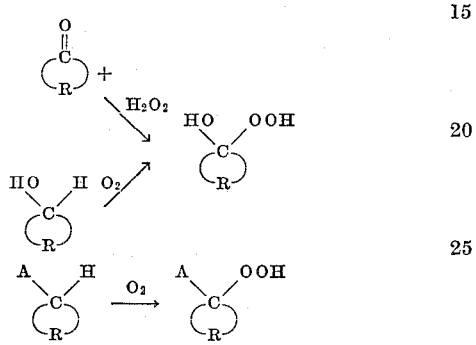

wherein R is a divalent substituted or unsubstituted hydrocarbon radical consisting of a carbon-carbon chain of 3 to 9 carbon atoms, which can be an unsubstituted methylene chain, or can contain an olefinic double bond, or phenylene or cyclohexylene group. The radical R, whether substituted or unsubstituted in basic structure, can contain any substituent which is inert toward the acid reactant or the redox agent and does not condense or polymerize under the conditions of reaction. Substituents which may be present at any location on the radical R include, but are not limited to, $C_1$–$C_{20}$ alkyl radicals, such as methyl, ethyl, propyl, butyl, dodecyl, octadecyl, etc., both straight-chain and branched chain; $C_6$–$C_{18}$ aryl, such as phenyl, naphthyl, anthracyl; $C_3$–$C_9$ cycloalkyl, such as cyclohexyl, cyclopentyl; mixed $C_1$–$C_{20}$ alkyl-$C_6$–$C_{18}$ aryl, such as benzyl, tolyl, xylyl, etc.; keto; hydroxy, carboxy, $C_1$–$C_{20}$ alkoxy, or $C_6$–$C_{18}$ aryloxy, such as methoxy, ethoxy, hexyloxy, decyloxy, phenoxy, etc.; $C_2$–$C_{21}$ carboalkoxy; and halogen, such as chloro, bromo, fluoro, iodo. For purposes of defining both types of starting materials, referred to by the foregoing equations, A is defined to include the hydroxyl group and any non-interfering organic radical illustrated by but not limited to: $C_1$–$C_{20}$ alkyl, $C_1$–$C_{20}$ alkoxy, $C_6$–$C_{18}$ aryl, $C_6$–$C_{18}$ aryloxy, $C_3$–$C_9$ cycloalkyl, $C_1$–$C_{20}$ alkyl-substituted $C_6$–$C_{18}$ aryl, $C_6$–$C_{18}$ aryl-substituted $C_1$–$C_{20}$ alkyl, $C_3$–$C_9$ cycloalkyl-substituted $C_6$–$C_{18}$ aryl and $C_6$–$C_{18}$ aryl-substituted $C_3$–$C_9$ cycloalkyl. Examples of A are methyl, ethyl, propyl, hexyl, decyl, octadecyl, methoxy, ethoxy, propoxy, hexyloxy, decyloxy, phenoxy, benzyloxy, tolyloxy phenyl, naphthyl, benzyl, tolyl, xylyl, cyclohexyl and the like.

In accordance with the foregoing, when A is alkyl, aryl, etc., then the product would be:

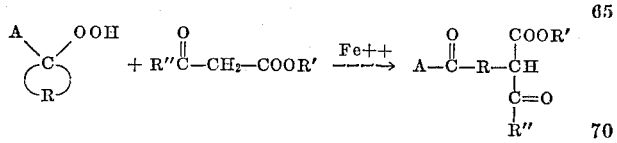

a diketocarboxylic acid ester, and correspondingly, when A is OH, the product is a monoketocarboxylic acid ester or when R′ is hydrogen the monoketodicarboxylic compounds are produced.

Examples of R in the primary ring structure of the above equations and formulae include but are not limited to, —$(CH_2)_3$—, —$(CH_2)_4$—, —$(CH_2)_5$—, —$(CH_2)_6$—, —$(CH_2)_9$—,

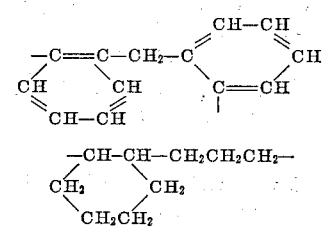

—CH—CH—CH$_2$CH$_2$CH$_2$—
   \           /
   CH$_2$      CH$_2$
     \       /
      CH$_2$CH$_2$

O
          ‖
—CH$_2$C—CH$_2$CH$_2$—

O
          ‖
—CH$_2$CH(COH)CH$_2$—CH$_2$—

O
               ‖
—CH$_2$CH(C—OCH$_3$)CH$_2$CH$_2$CH$_2$—

—(CH$_2$)$_3$—CH(CH$_2$)$_3$—
              |
              OH

—CH$_2$—CH—CH$_2$—CH$_2$—CH$_2$—
        |
        C$_4$H$_9$

—CH$_2$—CH—CH$_2$—
        |
        C$_6$H$_5$

—CH$_2$CH$_2$CH$_2$C(CH$_3$)$_2$—

—CH$_2$—CH—CH$_2$—
        |
        CH
       /  \
     CH$_2$  CH$_2$
      |     |
     CH$_2$  CH$_2$
       \  /
        CH$_2$

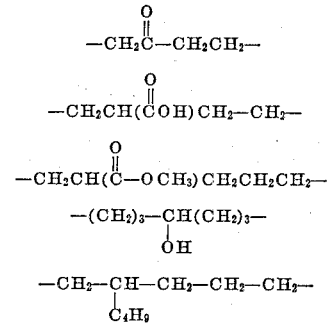

—CH$_2$CH(CH$_3$)CH$_2$CH$_2$—

—CH$_2$CH(OCH$_3$)CH$_2$CH$_2$CH$_2$—

—CH$_2$CH=CH—CH$_2$—

—CH$_2$CH(OH)CH$_2$CH$_2$—

—(CH$_2$)$_3$—CH—(CH$_2$)$_3$—
              |
              OCH$_3$

—CH$_2$CH$_2$—CH—CH$_2$—
              |
              C$_{18}$H$_{37}$

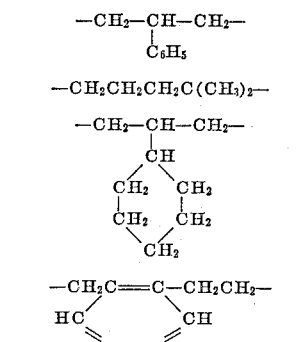

—CH$_2$CH—CH$_2$—CH$_2$—CH$_2$—CH$_2$—
       |
       C$_6$H$_5$CH$_2$

—CH$_2$—CH—CH—CH$_2$CH$_2$—
        |    |
        CH$_2$  CH$_2$
          \  /
         CH$_2$CH$_2$

—CH$_2$—CH—CH$_2$—CH$_2$—
        |
        Cl

—CH$_2$—CH—CH$_2$—CH$_2$—CH$_2$—
        |
        COOH

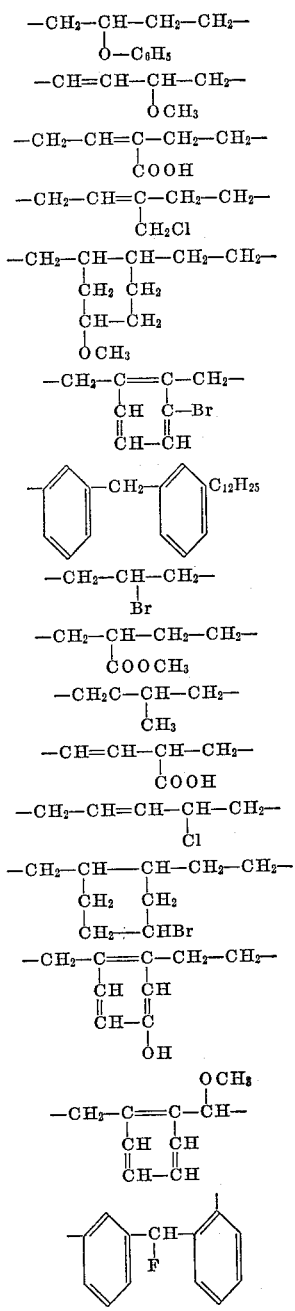

and similar structures.

The β-keto-acid or ester reactants used in accordance with this invention can be any β-keto-acid devoid of interfering groups, of the formula

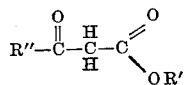

wherein R' is hydrogen or an organic radical of aliphatic, cyclic or aromatic structure as defined in relation to A or in addition can be $C_2$-$C_{20}$ alkenyl (olefinic) or a heterocyclic radical containing 5 or 6 cyclic atoms having one or two hetero-atoms, i.e., N, O, or S atoms and R" is an organic radical of aliphatic, olefinic cyclic aromatic or heterocyclic structure as defined in relation to R', with the exception that R' and R" cannot be alkoxy or aryloxy, to define keto acids or their esters. Thus in addition to the examples of radicals set forth herein in relation to the radical A of the carbocyclic peroxide, examples of R' and R" are isopropyl, butyl, isobutyl, t-butyl, amyl, isoamyl, isohexyl, octyl, nonyl, dodecyl, eicosyl, cyclopropyl, cyclobutyl, cyclopentyl, cycloheptyl, anthryl, α-methylnaphthylene, β-methylnaphthylene, benzohydryl, biphenylyl, bornyl, carvacryl, cetyl, styryl, cinnamyl, cymyl, duryl, fenchyl, fluorenyl, indanyl, menthyl, mesityl, phenethyl, furyl, and the like.

The process of this invention is readily carried out, requiring only those precautions associated with the handling of peroxides which are known to one skilled in the art.

The conditions of carrying out the above reactions generally vary somewhat in accordance with the type of reactants being used. The preferred starting materials are carbocyclic peroxides of the type obtained by reaction of oxygen with cycloalkanols and derivatives of cycloalkanes, or of hydrogen peroxide with cycloalkanones. For example, hydrogen peroxide reacts readily with cycloalkanones such as cyclobutanone, cyclopentanone, cyclohexanone, and cyclodecanone to produce the corresponding cycloalkanol hydroperoxide. The oxidation of cycloalkanols produces similar compounds. The oxidation of substituted cycloalkanes produces substituted cycloalkane hydroperoxides.

The carboxylic peroxide, e.g., cycloalkanol hydroperoxide, alkoxycycloalkyl hydroperoxide, or alkylcycloalkyl hydroperoxide is reacted in an inert solvent with a redox reducing agent and a β-keton-acid. The term "redox" is used herei nin its generally accepted sense to designate a reduction-oxidation reaction wherein an electron transfer takes place with the simultaneous formation of a free radical. In order for this reaction to take place, it is necessary that there be present a substance (or substances) which acts as a reducing agent for the peroxide compound. Those lower-valence compounds of heavy metals which are capable of existing in several valence states, such as iron, chromium, manganese, cobalt, copper, molybdenum, and tin, are suitable reducing agents to be used. Certain organic and inorganic compounds may also be used, such as sodium bisulfite, reducing sugars, 1-ascorbic acid, sodium formaldehyde sulfoxylate, and other reducing agents known in the redox art.

The temperature of the reaction may vary from −100° C. depending upon the stability of the reactants, although temperatures of −25° to +25° C. are preferred. Some of the peroxides are quite unstable, consequently the temperature of the reaction may have to be held quite low (viz., at or below about 0° C.) to prevent premature decomposition of these compounds. The reaction is preferably carried out in a mutual solvent for the carbocyclic peroxide compounds and the redox agent. Suitable solvents are water, alcohols, aromatic hydrocarbons, ethers, esters, diozane, and mixed solvents. The reaction may also be carried out in a dispersed or an emulsified medium. When an inorganic ferrous salt is used as the reducing agent, aqueous methanol is the preferred solvent. When ferrous salts of fatty acids are used, inert non-aqueous solvents are preferred. The reaction does not appear to be dependent upon pressure and may be carried out at any desired pressure, atmospheric pressure being preferred. The reactions may be carried out in a neutral or acid environment and in a batch-wise or continuous manner. Some of the peroxides are explosive and sensitive to shock, and therefore proper precautions should be taken in handling these materials.

Examples of β-keto carboxylic acids and their esters used as starting materials for the reaction of this invention include acetoacetic acid, methyl acetoacetate, ethyl acetoacetate, isopropyl acetoacetate, t-butyl acetoacetate, phenyl acetoacetate, benzylacetoacetate, furylacetoacetate, β-ketovaleric acid, β-ketocaproic acid, β-ketoheptanoic acid, β-ketocaprylic acid, β-ketopelargonic acid, β-ketocapric acid, β-ketohendecanoic acid, ethyl β-ketovalerate, butyl β-ketocaproate, phenyl β-ketoheptanoate, cyclohexylacetoacetate, phenylmethyl β-ketocaproate, isopropyl β-ketovalerate, 2-methylphenyl β-ketovalerate, benzoylacetic acid, methyl benzoyl acetate, ethyl benzoyl acetate, propyl benzoyl acetate, isopropyl benzoyl acetate, phenyl benzoyl acetate and phenethyl benzoyl acetate. A preferred group of β-keto carboxylic acids and their esters, for purposes of this invention, consists in acetoacetic acid, β-ketovaleric acid, β-ketocaproic acid, β-ketoheptanoic acid, β-ketocaprylic acid, β-ketopelargonic acid, β-ketocapric acid, β-ketohendecanoic acid, benzoyl acetic acid and the methyl, ethyl, propyl, isopropyl, butyl, phenyl and cyclohexyl esters thereof.

From the foregoing description of this invention it is apparent that when A is OH and R' is hydrogen, or when A is alkoxy (or aryloxy) and R' is hydrogen or other than hydrogen the products are monoketodicarboxylic acids, partial esters thereof or esters of such acids and when A is other than OH or other than alkoxy and R' is hydrogen or other than hydrogen the products are diketocarboxylic acids, partial esters thereof or esters of such acids.

The embodiments of the invention in which an exclusive property or privilege is claimed are defined as follows:

1. A process for the preparation of compounds of the formula

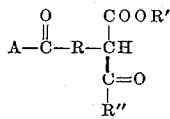

wherein A is a substituent of the group consisting of hydroxyl, $C_1$–$C_{20}$ alkyl, $C_6$–$C_{18}$ aryl, $C_1$–$C_{20}$ alkoxy, $C_6$–$C_{18}$ aryloxy, $C_3$–$C_9$ cycloalkyl, $C_1$–$C_{20}$ alkyl-substituted $C_6$–$C_{18}$ aryl, $C_6$–$C_{18}$ aryl-substituted $C_1$–$C_{20}$ alkyl, $C_3$–$C_9$ cycloalkyl-substituted $C_6$–$C_{18}$ aryl and $C_6$–$C_{18}$ aryl-substituted $C_3$–$C_9$ cycloalkyl, R is a divalent radical of the group consisting of $C_3$–$C_9$ polymethylene chains, $C_3$–$C_9$ polymethylene chains containing a double bond, $C_3$–$C_9$ polymethylene chains containing a double bond, $C_3$–$C_9$ polymethylene chains containing a phenylene group, $C_3$–$C_9$ polymethylene chains containing a $C_3$–$C_9$ cycloalkylene group and derivatives thereof containing substituents of the group consisting of hydroxy, keto, $C_6$–$C_{18}$ aryl, corresponding alkaryl, $C_3$–$C_9$ cycloalkyl, $C_1$–$C_{20}$ alkoxy, $C_6$–$C_{18}$ aryloxy, carboxy, $C_2$–$C_{21}$ carboalkoxy, and halogen, R' is a substituent of the group consisting of hydrogen, $C_1$–$C_{20}$ alkyl, $C_3$–$C_9$ cycloalkyl $C_6$–$C_{18}$ aryl-substituted $C_1$–$C_{20}$ alkyl, $C_3$–$C_9$ cycloalkyl substituted $C_6$–$C_{18}$ aryl, $C_6$–$C_{18}$ aryl-substituted $C_3$–$C_9$ cycloalkyl, $C_2$–$C_{20}$ alkenyl, 5-membered heterocyclic containing one hetero oxygen, sulfur or nitrogen atom, 5-membered heterocyclic containing two hetero nitrogen atoms, 6-membered heterocyclic containing one hetero oxygen or nitrogen and 6-membered heterocyclic containing two hetero nitrogen atoms and R" is a substituent of the group consisting of the substituents defined for R' except hydrogen, which comprises reacting a peroxide of the formula

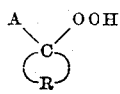

wherein A and R are as heretofore defined, with a compound of the formula

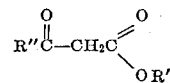

wherein R' and R" are as heretofore defined, in the presence of a redox reducing agent, in an inert solvent, at a temperature of about −100° C. to +100° C. and recovering said product.

2. The process in accordance with claim 1 in which A is hydroxyl, R is $C_3$–$C_9$ polymethylene, R' is hydrogen and R" is $C_1$–$C_{20}$ alkyl.

3. The process in accordance with claim 1 in which A is hydroxyl, R is $C_3$–$C_9$ polymethylene, R' is $C_1$–$C_{20}$ alkyl and R" is $C_6$–$C_{18}$ aryl.

4. The process in accordance with claim 1 in which A is $C_1$–$C_{20}$ alkyl, R is $C_3$–$C_9$ polymethylene, R' is hydrogen and R" is $C_1$–$C_{20}$ alkyl.

5. The process in accordance with claim 1 in which A is $C_1$–$C_{20}$ alkyl, R is $C_3$–$C_9$ polymethylene, R' is $C_1$–$C_{20}$ alkyl and R" is $C_6$–$C_{18}$ aryl.

6. The process in accordance with claim 1 in which A is $C_1$–$C_{20}$ alkoxy, R is $C_3$–$C_9$ polymethylene, R' is hydrogen and R" is $C_1$–$C_{20}$ alkyl.

7. The process in accordance with claim 1 in which A is $C_1$–$C_{20}$ aryloxy, R is $C_3$–$C_9$ polymethylene, R' is hydrogen and R" is $C_1$–$C_{20}$ alkyl.

8. The process in accordance with claim 1 in which A is $C_1$–$C_{20}$ alkoxy, R is $C_3$–$C_9$ polymethylene, R' is $C_1$–$C_{20}$ alkyl and R" is $C_1$–$C_{20}$ alkyl.

9. The process in accordance with claim 1 in which A is $C_1$–$C_{20}$ aryloxy, R is $C_3$–$C_9$ polymethylene, R' is $C_1$–$C_{20}$ alkyl and R" is $C_1$–$C_{20}$ alkyl.

10. The process in accordance with claim 1 in which the redox reducing agent is a salt of a multivalent metal in a lower valence state.

11. The process in accordance with claim 10 in which the redox reducing agent is of the group consisting of ferrous, stannous, chromous, cobaltous and cuprous salts.

12. The process which comprises reacting cyclohexanone peroxide with acetoacetic acid in aqueous alcohol solution at a temperature of about −25° to +25° C. in the presence of a redox reducing agent and recovering 2-octanone 3,8-dicarboxylic acid from the reaction mixture.

13. The process in accordance with claim 12 in which said acid product is recovered as the methyl ester.

14. The process which comprises reacting 1-methylcyclopentyl hydroperoxide with acetoacetic acid in aqueous alcohol solution at a temperature of about −25° to +25° C. in the presence of a redox reducing agent and recovering 2,8-nonanedione-3-carboxylic acid from the reaction mixture.

15. The process in accordance with claim 14 in which said acid product is recovered as the methyl ester.

16. The process which comprises reacting cyclopentanone peroxide with acetoacetic acid in aqueous alcohol solution at a temperature of about −25° to +25° C. in the presence of a redox reducing agent and recovering 2-heptanone-3,7-dicarboxylic acid from the reaction mixture.

17. The process in accordance with claim 16 in which said acid product is recovered as the methyl ester.

No references cited.

HENRY R. JILES, *Primary Examiner.*